US012798429B2

(12) United States Patent
Wang et al.

(10) Patent No.: US 12,798,429 B2
(45) Date of Patent: Nov. 17, 2026

(54) SMART POWER SOCKET FOR VEHICLE CHARGING

(71) Applicant: EVPal Connect LLC, Westland, MI (US)

(72) Inventors: Xiaoru Wang, Rochester Hills, MI (US); Qiang Mei, Novi, MI (US); Xianyu Zhang, Changsha City (CN); Jinlong Wang, Nanjing City (CN)

(73) Assignee: EVPal Connect LLC, Westland, MI (US)

( * ) Notice: Subject to any disclaimer, the term of this patent is extended or adjusted under 35 U.S.C. 154(b) by 683 days.

(21) Appl. No.: 18/227,110

(22) Filed: Jul. 27, 2023

(65) Prior Publication Data

US 2025/0033514 A1 Jan. 30, 2025

(51) Int. Cl.

*B60L 53/66* (2019.01)
*B60L 53/14* (2019.01)
*B60L 53/30* (2019.01)

(52) U.S. Cl.

CPC ............. *B60L 53/665* (2019.02); *B60L 53/14* (2019.02); *B60L 53/305* (2019.02)

(58) Field of Classification Search

CPC ........... B60L 53/66; B60L 53/14; B60L 53/30
See application file for complete search history.

(56) References Cited

U.S. PATENT DOCUMENTS

2013/0086409 A1* 4/2013 Lu ......................... G06F 1/3212 713/340
2017/0212399 A1* 7/2017 Tarng ......................... E06B 7/02
2017/0238401 A1* 8/2017 Sadwick .............. H05B 47/195 315/294
2018/0166894 A1* 6/2018 Miller ....................... H04B 5/79
2018/0220719 A1* 8/2018 Chang .................. A44B 11/005
2018/0289114 A1* 10/2018 Wheeler ................ H04B 1/385
2019/0097448 A1* 3/2019 Partovi ................... H01F 38/14
2019/0220318 A1* 7/2019 Yang ........................ G06F 9/445
2019/0354361 A1* 11/2019 Li ............................. G06F 8/65
2020/0251929 A1* 8/2020 Partovi ................. H02J 50/005
2020/0252713 A1* 8/2020 Larsen .................... H02J 50/12

* cited by examiner

*Primary Examiner* — Thien M Le
(74) *Attorney, Agent, or Firm* — Gunther J. Evanina; BUTZEL LONG

(57) ABSTRACT

A smart outlet is provided to allow charging of a vehicle using a standard 240 Volt socket provided with features that limit use to authorized users and collect and transmit billing information associated with a charging session for an authorized user following OCPP standard.

16 Claims, 3 Drawing Sheets

Function Diagram

Control Panel

Function Diagram

SMART POWER SOCKET FOR VEHICLE CHARGING

FIELD OF THE DISCLOSURE

This disclosure pertains to electricity outlets, and more particularly to 240 Volt alternating current electricity outlets.

BACKGROUND OF THE DISCLOSURE

Level 3 direct current (DC) charging stations are useful for rapid charging such as for travelers. However, it is often adequate and desirable to use slower AC charging from a standard 240 Volt outlet at public places, such as employer, shopping, hotel or other public parking areas. Such solution would provide vehicle charging infrastructure at a substantially lower cost than DC charging stations. AC charging stations require 240 Volt outlets to provide electricity access. For electric vehicle charging purpose, public 240 Volt electricity outlets are desirable to calculate energy consumption, perform onboard diagnostics to ensure safety, collect onboard operation data and transmit to designated data server, and provide electricity power to only authorized users.

SUMMARY OF THE DISCLOSURE

A smart 240 Volt outlet includes an AC outlet socket, a wireless communication device for facilitating communication between an authorized user and the station to receive authorization to energize the outlet socket, a relay for energizing the outlet socket, an energy conversion device for converting high-voltage AC to low voltage DC to power components of the smart outlet, an energy measurement module for determining the amount of energy provided from the outlet socket during a charging session, a processor for controlling the smart outlet and collecting and transmitting power usage and authorized user identification during a charging session to a remote server, and software that enables data transmission under OCPP standard.

A process of controlling the smart outlet includes steps of (a) diagnosing the condition of components of the smart outlet, and reporting any component failures or placing the smart outlet in standby mode; (b) determining whether an authorized user has authorized energization of an AC outlet socket of the smart outlet, and energizing the AC outlet socket if authorization is received, or returning to step (a) or repeating step (b) if authorization has not been received; (c) determining whether energy is being supplied from the AC outlet socket, and determining the amount of energy being supplied from the AC outlet socket, or, if an energy flow from the AC outlet socket is not detected, de-energizing the AC outlet socket and returning to standby mode after a predetermined time without energy flow from the AC outlet socket has elapsed; and (d) determining whether the authorized user has authorized de-energization of the AC outlet socket, and if authorization to de-energize is received, de-energizing the AC outlet socket, reporting the total energy output from the AC outlet socket between user authorization to energize and user authorization to de-energize, and returning to step (a) or step (b), or if authorization to de-energize is not received return to step (c).

DETAILED DESCRIPTION

Figure 1:
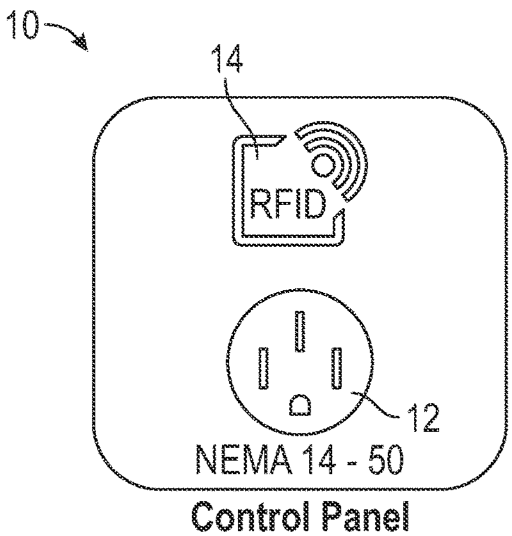
FIG. 1 is a front face of a smart outlet.
Figure 2:
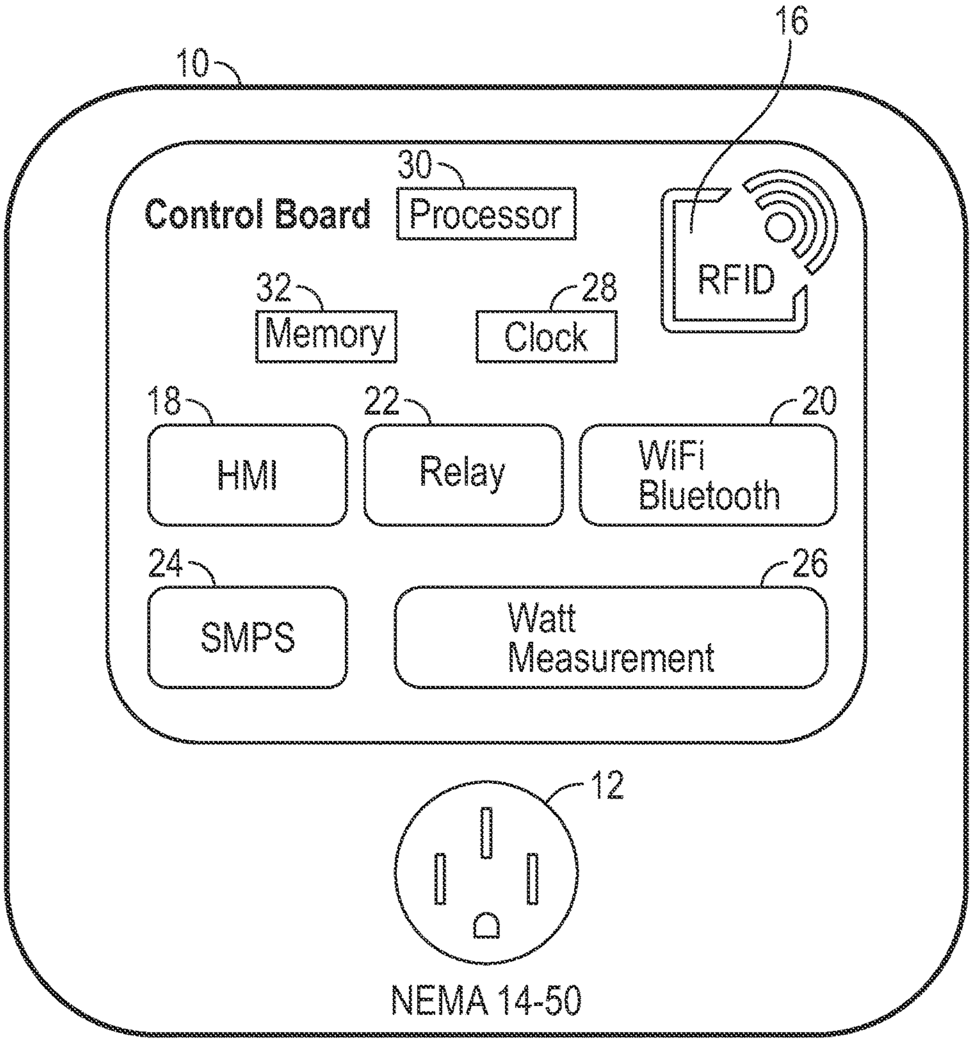
FIG. 2 is a function diagram of the smart outlet shown in FIG. 1.

A smart outlet 10 is shown in FIG. 1. Smart outlet 10 includes an electrical outlet socket 12 (e.g., a NEMA 14-50, nominal 240 Volt, socket), and an RFID logo 14 indicating the location for initiating authorization of a charging session using a card or other item having an RFID tag capable of transmitting an authorized user's identification to an RFID reader embedded in the smart outlet 10. Various components of the smart outlet 10 are represented schematically in FIG. 2. These components and their associated functionalities include an RFID reader 16, a human-machine interface 18, a wireless network adapter 20, a relay 22, a switch mode power supply 24 and an energy measurement module 26.

Human-machine interface (HMI) device 18 can comprise any of a variety of devices for facilitating interaction or exchange of information between an authorized user and smart outlet 10, such as a display screen for displaying station 10 status, amount of energy delivered (e.g., such as in kWhs), and/or the cost of the delivered energy. HMI 18 can also, for example, be a near field communication (NFC) reader that could be used as an alternative to RFID for allowing an authorized user to energize the outlet socket 12.

Wireless network adaptor 20 can for example be a Wi-Fi adapter, a Bluetooth adapter, or a cellular wireless modem (such as for 3G, 4G or 5G communications).

Relay 22 allows a processor 30 to supply voltage on an inlet side of the socket 12 to the outlet side when an authorized user has provided authorization to initiate a charging session.

Switch mode power supply 24 is a device for converting high AC voltage (e.g., 220 Volt AC) to a lower DC voltage (e.g., 5 Volts or 12 Volts) for powering components such as devices 16, 18, 20, 22, 24, 26, 28 and 30.

Energy measurement module 26 can be an energy meter that outputs a signal indicating the amount of energy provided from socket 12 during a charging session. Such devices are well known and commercially available. Alternatively, module 26 may comprise an ammeter for measuring the current from the socket 12, a voltage meter for measuring the voltage from the socket 12, and a processor that can receive a clock signal, such as from clock 28, and calculate the energy provided during the charging session by integrating the product of the measured voltage and current over time. Processor 30 can be used for the calculation or a separate dedicated processor can be used. The measurements and clock signal can be stored locally in memory 32 for transmission to a billing center at the conclusion of the charging session.

Figure 3:
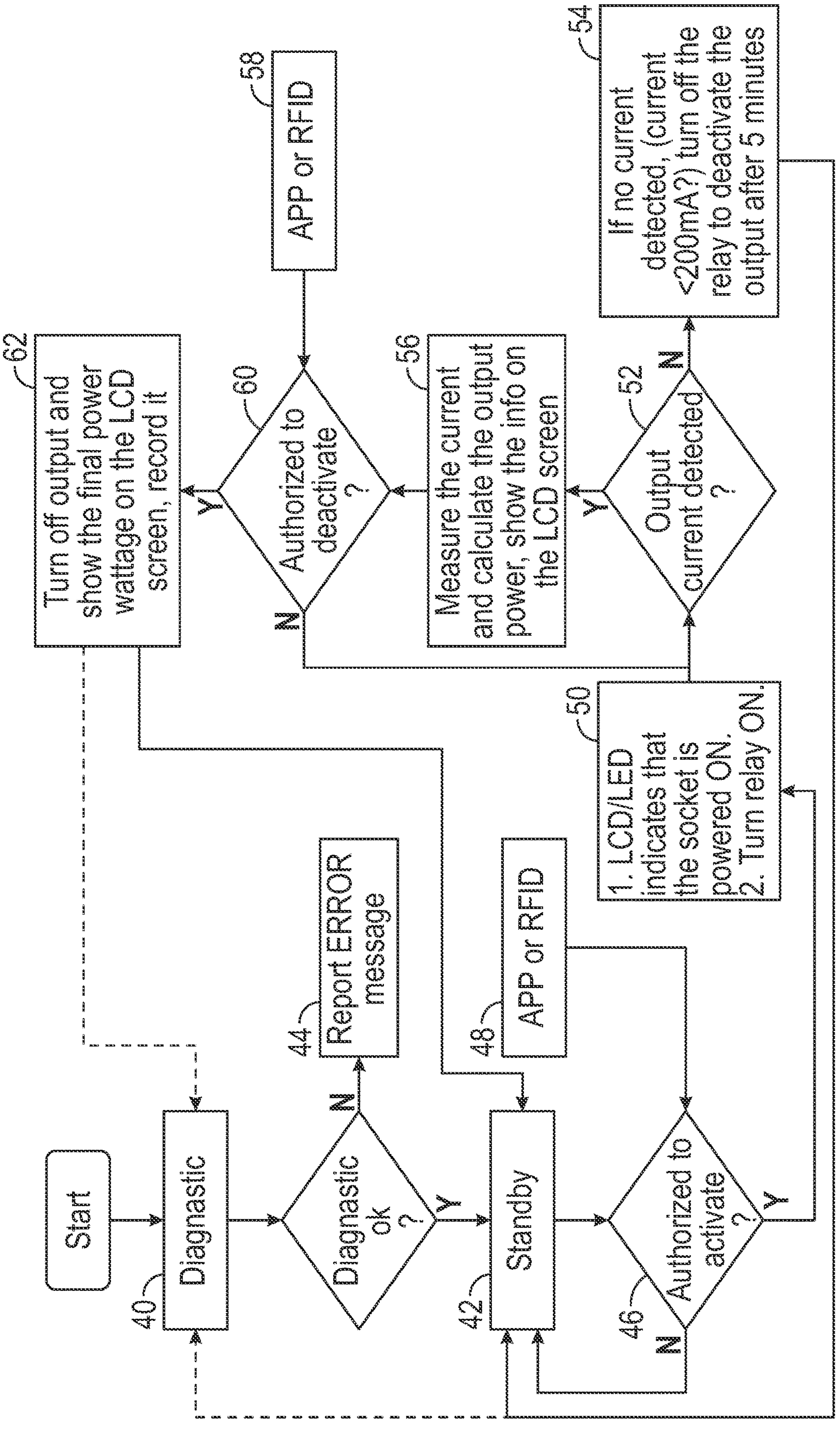
FIG. 3 is a flow diagram of a process for controlling the smart outlet shown in FIG. 1.

A process control flow chart for the smart outlet is shown in FIG. 3. The process begins with a step 40 of checking diagnostics of smart outlet components. If the diagnostics check is acceptable, the smart outlet 10 goes into standby mode 42 where it waits to detect authorization from an authorized user to initiate a charging session. If a fault is detected, the fault is reported 44, such as via Wi-Fi or cellular communications device, to a remote server accessible by maintenance and repair personnel. If a fault is detected, the smart outlet is taken out of service and notice of same can be provided via HMI 18 or via an application running on the authorized user's mobile device (e.g., smartphone).

Depending on configuration, an authorized user may be able to authorize energization of outlet 12 via a smartphone application using Wi-Fi, Bluetooth or NFC, or with a card, token or the like having a RFID. While in standby mode, the smart outlet periodically checks 46 to determine whether an application or RFID 48 has authorized energization of outlet 12. If energization has been authorized, an LED or LCD display 18 can indicate 50 that socket 12 has been powered, or such indication can be provided via a mobile application running on the user's smartphone.

Next, the process can check 52 whether current is flowing from outlet 12. Energy measurement module 26 can be used for this purpose. If a current is not detected 54 over a predetermined period of time (e.g., 5 minutes), relay 22 can be switched off to de-energize outlet 12, otherwise, the energy (or current and voltage) can be measured 56 and tracked (stored in memory) over time during the charging session.

At any time during a charging session, the authorized user can authorize 58 de-energization via the smartphone application or the RFID tag. Once authorization for de-energization is detected 60, relay 22 turns off 62 output from socket 12 and the total energy provided is communicated to a remote server (such as at a billing center). Thereafter, the station 10 can be returned to standby mode 42 or to a diagnostics check 40.

Figure 4:
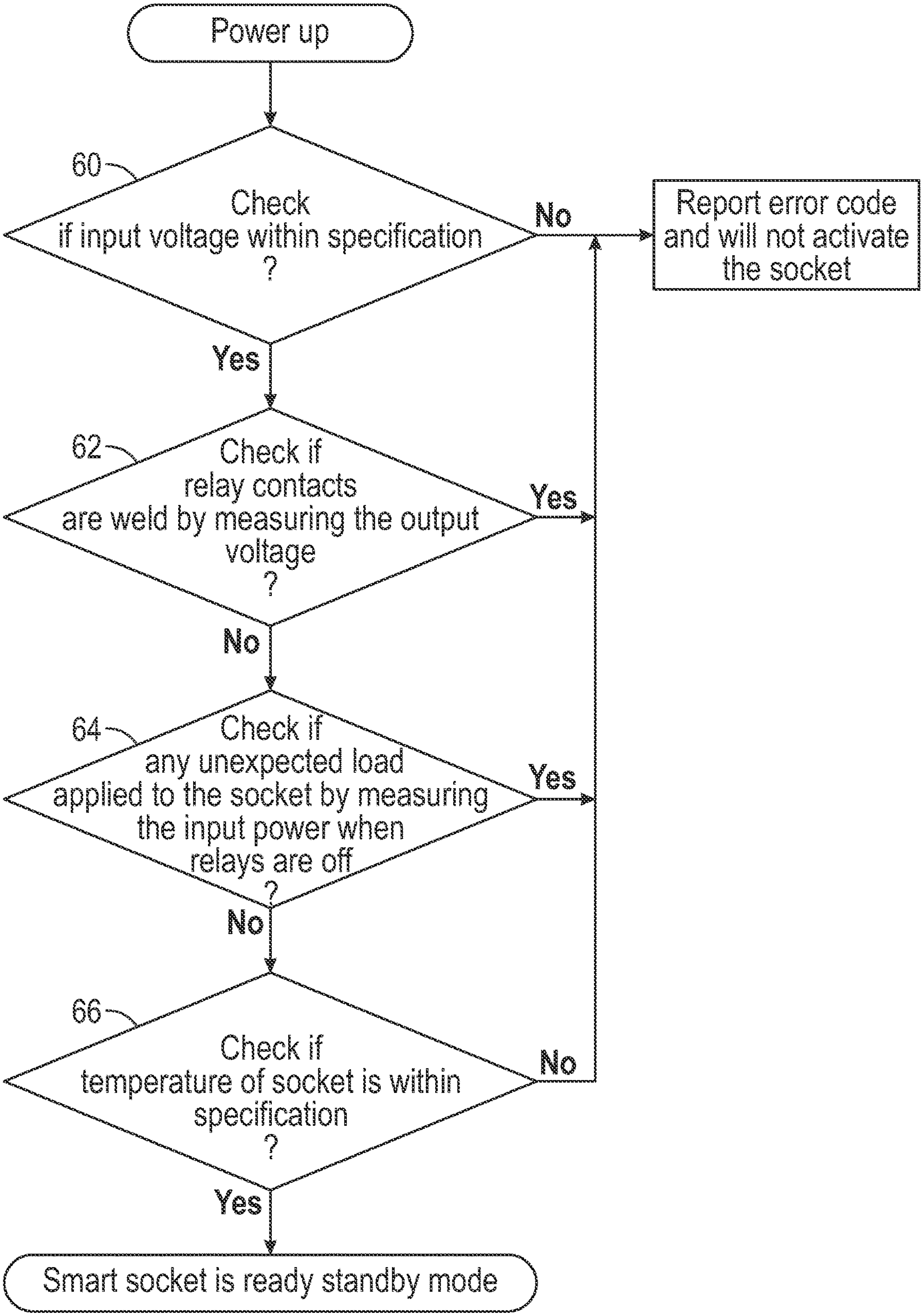
FIG. 4 is a diagram showing details of the diagnostics step in the process shown in FIG. 3.

Diagnostics are illustrated in FIG. 4. Diagnostics checks can include checking whether voltage at the input to socket 12 is within a predetermined acceptable range (e.g., 208 Vac to 250 Vac volts) 60, whether voltage at the output from socket 12 is within a predetermined acceptable range 62, which may be the same or different from the acceptable input voltage range. The diagnostics may also include checking 64 if there are any unexpected loads in excess of what would be expected to power the low voltage components of the station 10 (e.g., comprising 16, 18, 20, 22, 24, 26, 28, 30 and 32) applied to the socket input when the relay de-energizes the socket output. The diagnostics may also include a check 66 of the temperature at the socket (e.g., using a thermocouple, thermistor or other temperature sensor that can provide a signal to processor 30). If the temperature is outside of a predetermined acceptable range (e.g., −20° C. to 40° C.), the station 10 can be taken out of service. Also, unacceptable voltages will result in the smart outlet 10 being removed from service, errors reported to maintenance, and a disabled status can be communicated via a mobile application or HMI 18.

Desirably, smart outlet 10 is configured to be in full compliance with Open Charge Point Protocol standards (OCPP 2.0.1, published by the Open Charge Alliance, Mar. 31, 2020).

The invention claimed is:

1. A smart outlet comprising:

an AC outlet socket;

a short-range wireless communications device for receiving authorization from an authorized user to allow energization of the AC outlet socket;

a relay for energizing the AC outlet socket when authorization is received by the short-range wireless communications device;

an energy measurement module to determine the amount of energy provided from the smart outlet during a charging session;

a power converter for converting high-voltage AC power to low voltage DC power for powering the short-range wireless communications device and the energy measurement module; and a processor configured for controlling components of the smart outlet and recording and transmitting to a remote server an identification of the authorized user and the amount of energy supplied from the smart outlet during the charging session.

2. The smart outlet of claim 1, wherein the AC outlet socket is a NEMA 14-50 socket.

3. The smart outlet of claim 1, wherein the short-range wireless communications device is an RFID reader.

4. The smart outlet of claim 1, wherein the short-range wireless communications device is an NFC reader.

5. The smart outlet of claim 1, wherein the short-range wireless communications device is a Bluetooth adapter.

6. The smart outlet of claim 1, further comprises memory for storing the energy measurements from the energy measurement module and associated user identification for a charging session.

7. The smart outlet of claim 1, wherein the energy measurement module includes a passthrough kilowatt hours meter that transmits a signal to the processor.

8. The smart outlet of claim 1, further comprising a wireless network adapter.

9. The smart outlet of claim 1, further comprising a cellular wireless modem.

10. A smart outlet comprising:

an AC outlet socket;

a short-range wireless communications device for receiving authorization to allow energization of the AC outlet socket;

a relay for energizing the AC outlet socket when authorization is received by the short-range wireless communications device;

an energy measurement module to determine the amount of energy provided from the smart outlet during a charging session;

a power converter for converting high-voltage AC power to low voltage DC power for powering the short-range wireless communications device and the energy measurement module; and a processor for controlling components of the smart outlet and recording and transmitting an identification of an authorized user and the amount of energy supplied from the smart outlet; and wherein the energy measurement module includes an ammeter, a voltage meter, a clock, and a processor for receiving a measured current from the ammeter, a measured voltage from the voltage meter, and a time signal from the clock, and for calculating energy supplied from the AC outlet socket by integrating the product of the measured voltage and current as a function of time.

11. A smart outlet comprising:

an AC outlet socket;

a short-range wireless communications device for receiving authorization to allow energization of the AC outlet socket;

a relay for energizing the AC outlet socket when authorization is received by the short-range wireless communications device;

an energy measurement module to determine the amount of energy provided from the smart outlet during a charging session;

a power converter for converting high-voltage AC power to low voltage DC power for powering the short-range wireless communications device and the energy measurement module; and a processor for controlling components of the smart outlet and recording and transmitting an identification of an authorized user and the amount of energy supplied from the smart outlet; and wherein the embedded software that operates on the processor follows OCPP standard in enabling electricity power for authorized users, collecting information such as calculated energy, diagnostic status, service billing and transmitting data to designated data server.

12. The smart outlet of claim 11, wherein the smart outlet is configured to be in compliance with OCPP 2.0.1.

13. A process for controlling a smart outlet, comprising the steps of:

(a) diagnosing the condition of components of the smart outlet, and reporting any component failures or placing the smart outlet in standby mode;

(b) determining whether an authorized user has authorized energization of an AC outlet socket of the smart outlet, and energizing the AC outlet socket if authorization is received, or returning to step (a) or repeating step (b) if authorization has not been received;

(c) determining whether energy is being supplied from the AC outlet socket, and determining the amount of energy being supplied from the AC outlet socket, or, if an energy flow from the AC outlet socket is not detected, de-energizing the AC outlet socket and returning to standby mode after a predetermined time without energy flow from the AC outlet socket has elapsed;

(d) determining whether the authorized user has authorized de-energization of the AC outlet socket, and if authorization to de-energize is received, de-energizing the AC outlet socket, reporting the total energy output from the AC outlet socket between user authorization to energize and user authorization to de-energize, and returning to step (a) or step (b), or if authorization to de-energize is not received return to step (c).

14. The method of claim 13, wherein the step of diagnosing the condition of components of the smart outlet includes:

(1) determining whether the input voltage to the smart outlet is within a first predetermining range;

(2) determining whether the output voltage of the AC outlet socket is within a second predetermined range when the AC outlet socket is energized; and (3) reporting any voltage determinations that are out of the predetermined ranges.

15. The method of claim 14, wherein the step of diagnosing the condition of components of the smart outlet further comprises determining whether there is an unexpected load applied to the input power of the smart outlet when the AC outlet socket is de-energized, and reporting any unexpected load.

16. The method of claim 14, wherein the step of diagnosing the condition of components of the smart outlet further comprises determining whether a temperature measured at the AC outlet socket is within a predetermined range, and reporting any outside range temperature.

* * * * *